(12) United States Patent
Lacaille (10) Patent No.: US 9,176,926 B2
(45) Date of Patent: Nov. 3, 2015

(54) MONITORING OF AN AIRCRAFT ENGINE FOR ANTICIPATING MAINTENANCE OPERATIONS

(75) Inventor: Jerome Henri Noel Lacaille, Rosny Sous Bois (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 13/985,662

(22) PCT Filed: Feb. 13, 2012

(86) PCT No.: PCT/FR2012/050309
§ 371 (c)(1),
(2), (4) Date: Aug. 15, 2013

(87) PCT Pub. No.: WO2012/110733
PCT Pub. Date: Aug. 23, 2012

(65) Prior Publication Data
US 2013/0325286 A1    Dec. 5, 2013

(30) Foreign Application Priority Data
Feb. 15, 2011 (FR) ...................................... 11 51238

(51) Int. Cl.
G06F 17/00 (2006.01)
B64F 5/00 (2006.01)
G05B 23/02 (2006.01)

(52) U.S. Cl.
CPC .............. *G06F 17/00* (2013.01); *B64F 5/0045* (2013.01); *G05B 23/0221* (2013.01); *G05B 23/0283* (2013.01)

(58) Field of Classification Search
CPC ...................................................... G06F 17/00

USPC ............................................................ 701/99
See application file for complete search history.

(56) References Cited

U.S. PATENT DOCUMENTS

| 6,334,344 | B1 * | 1/2002 | Bonhoure et al. ............... 70/11 |
| 6,631,263 | B1 * | 10/2003 | Corkery ........................ 455/436 |
| 2005/0114090 | A1 | 5/2005 | Black et al. |
| 2008/0082299 | A1 * | 4/2008 | Samardzija et al. .......... 702/187 |
| 2008/0091630 | A1 | 4/2008 | Bonissone et al. |

(Continued)

OTHER PUBLICATIONS

International Search Report Issued May 8, 2012 in PCT/FR12/050309 Filed Feb. 13, 2012.

*Primary Examiner* — Calvin Cheung
*Assistant Examiner* — Martin Weeks
(74) *Attorney, Agent, or Firm* — Oblon, McClelland, Maier & Neustadt, L.L.P.

(57) ABSTRACT

A method monitoring an aircraft engine, including: collecting time history measurements on a first set of measurements on endogenic variables and a second set of measurements on exogenic variables; standardizing measurements related to the endogenic variables considering the exogenic variables to form an entry point corresponding to a condition of a current engine in a multi-dimensional space, for each acquisition; projecting each multi-dimensional space entry point onto an image point on a previously constructed map, forming a sequence of image points on the map reflecting a distribution of the multi-dimensional space entry points, the image points forming a current trajectory representing a change to conditions of the current engine; comparing an end of the current trajectory with previously recorded portions of aircraft engine trajectories kept in a database; and analyzing statistical variations of the trajectories to anticipate maintenance operations on the current engine.

15 Claims, 6 Drawing Sheets

(56) References Cited

U.S. PATENT DOCUMENTS

| | | | |
|---|---|---|---|
| 2009/0119126 A1* | 5/2009 | Johnson et al. | 705/2 |
| 2009/0157403 A1* | 6/2009 | Chung et al. | 704/254 |
| 2010/0070173 A1* | 3/2010 | Sakamoto | 701/209 |
| 2011/0122153 A1* | 5/2011 | Okamura et al. | 345/629 |
| 2011/0238855 A1* | 9/2011 | Korsunsky et al. | 709/231 |

* cited by examiner

MONITORING OF AN AIRCRAFT ENGINE FOR ANTICIPATING MAINTENANCE OPERATIONS

DOMAIN OF THE INVENTION

The domain of this invention is monitoring of an aircraft engine. In particular, the invention relates to a monitoring method and system to anticipate maintenance operations of an aircraft engine.

During every flight, an aircraft records and sends information about its operation using a message system called ACARS (Aircraft Communication Addressing and Reporting System). These data are retrieved by ground stations in real time for immediate processing in the case of obvious anomalies, and otherwise to be archived with all fleet data. Other data are also available and may be recorded on onboard computers during the flight and regularly downloaded to enrich information about engines.

These data are then viewed by experts to monitor smooth operation of the engine. More particularly, the experts analyse the shape of time history curves of the shaft rotation speed N2, the fuel flow (fluid flow) FF and the exhaust gas temperature (EGT) obtained from successive flights to diagnose the condition of an engine.

The tools used require manual interpretation of data and transmission of know how between engine experts. This requires a long analysis time and it is also difficult to analyse all data in all contexts knowing that a given engine never functions under exactly the same conditions during operational flights. Data acquisition conditions are systematically different: they depend on piloting, the weather, the trajectory, engine wear, etc. For example, the shape of the curves corresponding to data derived from aircraft overflying the sea is different from the shape created from data derived from aircraft overflying dry land. However, experts are usually specialised in specific engines on aircraft fleets that always perform the same missions. Thus, it is difficult for experts to make use of all data that may be relevant for monitoring of engines.

Consequently, the purpose of this invention is monitoring of correct operation of engines and changes to their conditions based on a non-supervised analysis of the structure of measurements on engines in order to make a prediction and plan maintenance operations very precisely without the above-mentioned disadvantages.

PURPOSE AND SUMMARY OF THE INVENTION

This invention relates to a method of monitoring an aircraft engine, comprising the following steps:
- collect time history measurements on variables related to a current engine and its environment, comprising a first set of measurements on endogenic variables describing behaviour of the engine and a second set of measurements on exogenic variables describing the acquisition context, during each acquisition;
- standardise measurements related to endogenic variables taking account of measurements related to exogenic variables to form an entry point corresponding to a condition of said current engine in a multi-dimensional space, for each acquisition;
- use a determined compression technique to project each entry point in the multi-dimensional space onto an image point on a previously constructed map, to form a sequence of image points on said map reflecting the distribution of entry points in the multi-dimensional space, said image points forming a current trajectory representative of a change to the conditions of said current engine;
- compare a portion of the end of said current trajectory with previously recorded portions of aircraft engine trajectories kept in a database to search for similar trajectories; and
- analyse the statistical variation of said end of current trajectory as a function of said similar trajectories to anticipate maintenance operations on said current engine.

This method can be used to map data dealing with the condition of the engine independently of the context, to search for engines that have had a similar behaviour in the past, to statistically analyse events that occurred on the found engines, in order to improve planning of maintenance operations and to get a better view of potential degradations and failures of the current engine. This method can also be used to model distribution of the events law and to obtain conditional state change probabilities in order to improve planning of design and replacement parts availability logistics.

Said map is constructed during a preliminary learning phase according to said determined compression technique determined from a set of standardised learning data.

Advantageously, said determined compression technique is a Kohonen self-organising map technique.

Advantageously, the method also comprises a display of image points on at least one two-dimensional map.

Advantageously, the method comprises a display of said current trajectory on a plurality of two-dimensional map backgrounds each representing one of said endogenic variables.

Advantageously, the method includes a display of said end of current trajectory and first similar trajectories classified by order of similarity on a plurality of two-dimensional map backgrounds.

Advantageously, the method comprises a map background display corresponding to a hierarchical classification of different map backgrounds representative of endogenic variables, into homogeneous zones.

Advantageously, the method comprises a display of a current condition of a plurality of engines on a plurality of 2D map backgrounds each representing one of said endogenic variables.

According to one feature of this invention, the method comprises an adaptation step to transform said map over time taking account of said entry points. Thus, the new points are taken into account to further refine the map so as to get a better prediction of maintenance operations.

According to one aspect of this invention, the standardisation step comprises a step to normalise endogenic variables using a regression model on a space of context variables, generated by analytic combinations of exogenic variables. This pre-processing consists of using a regression model on additional context variables, for example constructed from polynomial, exponential and logarithmic transformations of the initial exogenic variables, to efficiently eliminate the influence of the acquisition context (in other words environmental effects and set values) on endogenic variables describing the condition of the engine, before building the map, without eliminating any information useful for maintenance and diagnostic.

Advantageously, the standardisation step also comprises a step to select the relevant variables among said context variables according to a minimisation criterion. This can limit the calculation time by eliminating the least relevant context variables without limiting the precision of the standardisation.

Advantageously, the standardisation step also comprises a step to clean noise on normalised endogenous variables using a tool to detect sudden changes. This can facilitate interpretation of the map and help to precisely monitor slow changes of trajectories and sudden changes to them.

Advantageously, the comparison between a portion of said current trajectory and other portions of trajectories is made using an edition distance measuring the similarity between the different portions of trajectories.

The invention also relates to a system for monitoring an aircraft engine, comprising:
  measurement means to collect time history measurements of variables related to a current engine and its environment, comprising a first set of measurements on endogenous variables describing the behaviour of the engine and a second set of measurements on exogenous variables describing the acquisition context, during each acquisition;
  processing means to standardise measurements related to endogenous variables taking account of measurements related to exogenous variables to form an entry point representing a condition of said current engine in a multi-dimensional space, for each acquisition;
  processing means to project each entry point in the multi-dimensional space onto an image point of a previously constructed map using a determined compression technique, to form a sequence of image points on said map reflecting the distribution of entry points in the multi-dimensional space, said image points forming a current trajectory representative of a change to the condition of said current engine;
  processing means to compare a portion of the end of said current trajectory with previously recorded portions of trajectories of other aircraft engines, kept in the database to search for similar trajectories; and
  processing means to analyse the statistical variation of said end of current trajectory as a function of said similar trajectories to anticipate maintenance operations on said current engine.

The invention also relates to a computer program containing code instructions for use of the standardisation method according to the above characteristics when it is run by processing means.

BRIEF DESCRIPTION OF THE DRAWINGS

Other special features and advantages of the device and the method according to the invention will become clearer after reading the description given below for information purposes but in no way limitative, with reference to the appended drawings in which.

Each of FIGS. 4A-4C shows a graphic representation of a current trajectory of an engine on a map background representing the exhaust gas temperature.

DETAILED DESCRIPTION OF EMBODIMENTS

The principle of the invention consists of making the best use of the life history of monitored engines to find similar behaviours in these engines that lead to maintenance operations. Thus, by observing instantaneous changes to a given engine, it is possible to find similar trajectories followed by other engines in the past and to deduce statistics for future maintenance operations.

Figure 1:
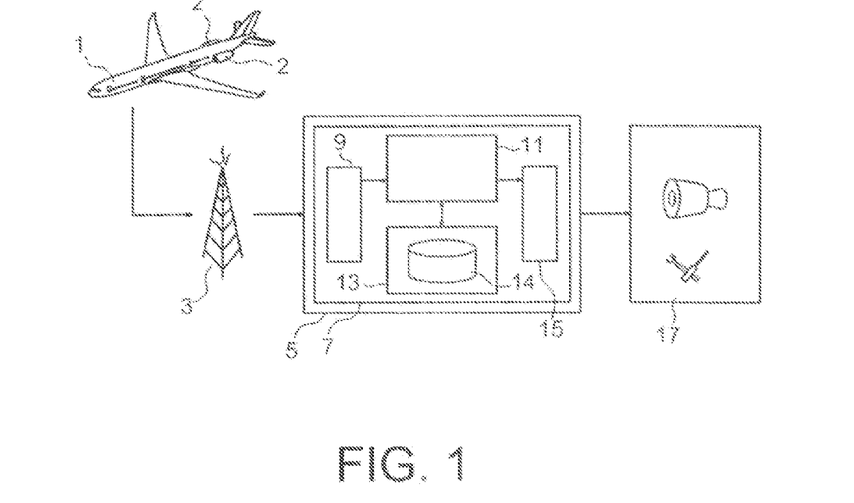
FIG. 1 diagrammatically shows hardware means used in the system or method that can be used for monitoring an aircraft engine according to the invention.

FIG. 1 shows an example of equipment means used in the system or method for monitoring an aircraft engine according to the invention.

During a flight, an aircraft 1 records information about its operation and different environmental parameters. These data recorded by onboard computers (for example FADEC, ACMS, DAR, QAR, etc.) are derived from measurements made by measurement means or sensors integrated into the aircraft 1. For example, the FADEC (that controls the engine) records a number of variables measured by sensors integrated into the engine 2 to control the engine 2 and also to act as a basis for a predictive maintenance procedure.

Thus, some sensors integrated into the aircraft 1 collect time histories of measurements on variables related to the engine 2 of the aircraft and its environment. In each acquisition, these measurements include a first set of measurements on endogenous variables describing the behaviour of the engine 2 and a second set of measurements on exogenous variables describing the acquisition context.

For example, the endogenous variables may include the shaft rotation speed N2, the fuel flow FF, the fluid temperatures and pressures at different locations in the engine (for example before and/or after compression), the exhaust gas temperature (EGT), etc.

Exogenous variables may include the following variables: outside temperature, altitude, aircraft weight, anti-frost on wings, anti-frost on pod, bleed valve, variable bypass valve (VBV) geometry, variable stator vanes (VSV), high pressure (HP) and low pressure (LP) turbine set values, HP compressor opening, environmental control system (ECS) air bleed, fan rotation N1, thrust lever angle (TLA), aircraft speed (Mach number), etc.

An aircraft 1 also regularly sends short snapshot messages to the ground derived from measurements of endogenous and exogenous variables. During each flight, the aircraft 1 usually sends at least two messages to the ground, one during takeoff and the other during the cruising phase. These messages are sent by satellite (AGARS protocol) using a digital data transmission system between the aircraft in flight and the ground (other communication protocols are possible including PCMCIA, 3G, etc.).

Ground stations 3 retrieve the different messages sent at different dates for different aircrafts 1 and for different engines 2 and then send them through a communication link to a management centre 5. This management centre comprises a computer system 7 normally comprising input means 9, processing means 11, storage means 13 and output means 15. It should be noted that other data recorded during the flight on onboard computers may also be downloaded regularly to enrich information about engines 2.

The different data derived from messages received directly from the different aircrafts 1 or data retrieved on the ground from the different internal memories of onboard computers are stored in storage means 13 to form a database 14 covering an entire fleet of engines 2.

The database 14 thus comprises a plurality of measurements collected over time on endogenic and exogenic variables of different aircrafts 1 and different engines 2. These measurements are associated with acquisition dates or flight dates and identifiers used to identify the engines and aircraft concerned.

The management centre 5 uses this database 14 to formalise and compare engine trajectories 2 in a metric space. This analyses the variation of characteristics related to operation of engines 2 in a non supervised manner, to program maintenance operations 17.

The analysis comprises a preliminary processing of data to eliminate the influence of external conditions and set values on endogenic variables describing the condition of the engines 2. The data acquisition context may be very variable. For example, measurements concerning takeoff acquired during the first flight of the day during which the engine is started up cold may be different from measurements acquired during other flights during the day. Other examples concern the variation of weather conditions (rain, snow, frost, etc.), change of pilots, the location being overflown (above the sea, desert, land, etc.). Obviously all these effects can influence the measurements.

Thus, measurements collected over time on variables related to a current engine 2 and its environment are firstly standardised by the processing means 11. More particularly, measurements related to endogenic variables are standardised taking account of measurements related to exogenic variables to form an entry point representing a condition of the current engine, for each acquisition. The entry point is thus represented independently of the acquisition context, in a multi-dimensional space with a dimension equal to the number of endogenic variables.

Standardisation is based particularly on a normalisation step of endogenic variables according to a regression model. It should be noted that additional variables constructed from calculations using initial exogenic variables can be taken into account to form a set of context variables, so as to improve the results of the regression model.

Thus, normalisation can be done using a general linear regression model defined on a space of context variables generated by analytic combinations (polynomial and/or non-polynomial) of exogenic variables.

In this case, we will assume that the measurements are collected on a set of I engines and that there are $n_i$ measurement acquisitions for each engine ($1 \leq i \leq I$). Each acquisition may be expressed by a pair composed of an endogenic vector $Y_{ij}$ and a context vector $X_{ij}$. We will assume that each endogenic vector $Y_{ij}$ contains p endogenic variables $Y_{ij} = (Y_{ij}^1, \ldots, Y_{ij}^p)$ and that each context vector $X_{ij}$ contains q context variables $X_{ij} = (X_{ij}^1, \ldots, X_{ij}^q)$ where $1 \leq i \leq I$ and $1 \leq j \leq n_i$. Each context variable may be constructed using a polynomial transformation, a product or analytic combination (for example inverse, root, log, exp, etc.) of exogenic variables.

In the scope of a linear regression model, the endogenic vectors are assumed to linearly depend on the context vectors. This can be formally written by the following equation for each of the endogenic variables ($r \in \{1, \ldots, p\}$):

$$Y_{ij}^r = \mu^r + \alpha_i^r + \lambda_1^r X_{ij}^1 + \ldots + \lambda_q^r X_{ij}^q + \epsilon_{ij}^r$$

$\mu^r$ is the intercept of the endogenic variable $Y_{ij}^r$, $\alpha^r$ is a parameter that depends on the engine such that the endogenic variable $Y_{ij}^r$ can for example take account of the age of the engine, $\epsilon$ is the residue vector, and a non-colinearity constraint $$\sum_i n_i \alpha_i^r = 0$$

can be added, in which $n_i$ is the number of acquisitions.

However, the number of context variables may be fairly large and it is therefore advantageous if standardisation can include a step to select relevant variables to limit the calculation time and prevent over-parameterisation. Selection makes it possible to keep only a small number of combinations used to eliminate the acquisition context. In other words, data are selected and regression is then done on the context to obtain residues that are independent of the acquisition context.

Thus, a sub-set of relevant context variables could be selected using a minimisation criterion based on a criterion such as minimising the sum of the squares of the residues with a constraint on the sum of the absolute values of the coefficients (for example according to the LASSO criterion), as follows:

$$\sum_{i,j} \left( Y_{i,j}^r - \sum_{l=1}^q \lambda_l^r X_{i,j}^l \right)^2 \text{ where } \sum_{l=1}^q |\lambda_l^r| < C^r$$

Due to this constraint, the coefficients of the least relevant variables are not used and are equal to zero.

Advantageously, standardisation may also include a step to clean noise on normalised endogenic variables using a sudden change detection tool. The use of this tool within the residues of endogenic variables normalised relative to exogenic variables can help to identify particular events that affected the life of the engine, regardless of whether these events are maintenance operations or sudden degradations of some engine components. A sudden change can be physically identified as a sudden modification to the condition of the engine that may correspond to a sudden engine degradation (for example an object that entered the engine), or a manipulation on the engine (for example replacement of a part during a maintenance operation between two flights).

Figure 2A:
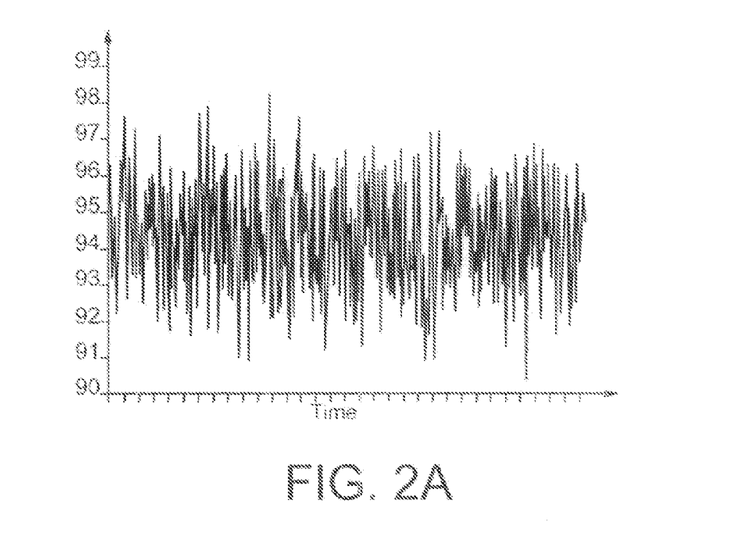
FIGS. 2A and 2B show signals from an endogenous variable before and after normalisation.
Figure 2B:
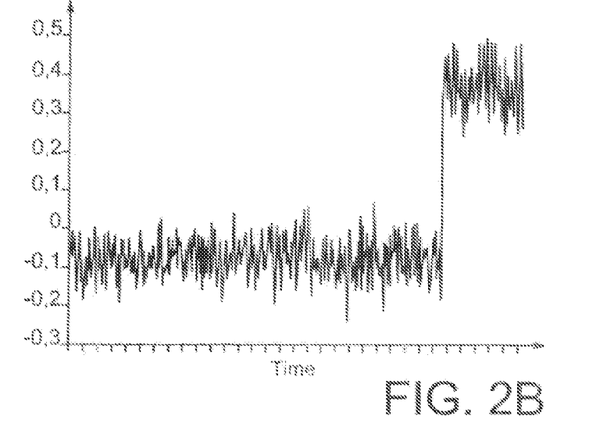

FIGS. 2A and 2B are examples showing signals of the shaft rotation speed N2 before and after normalisation depending on the context and before detecting the change and cleaning the noise.

FIGS. 2C-2G show smoothed measurements after elimination of the noise and after detection of changes. The measurements in FIGS. 2C-2G concern the exhaust gas temperature EGT, the shaft rotation speed N2, the fuel flow FF, the pressure and the temperature respectively. Rupture dates are represented by a vertical line and signals estimated using the detection tool are shown in solid lines.

Figures 2C, 2D, 2E:
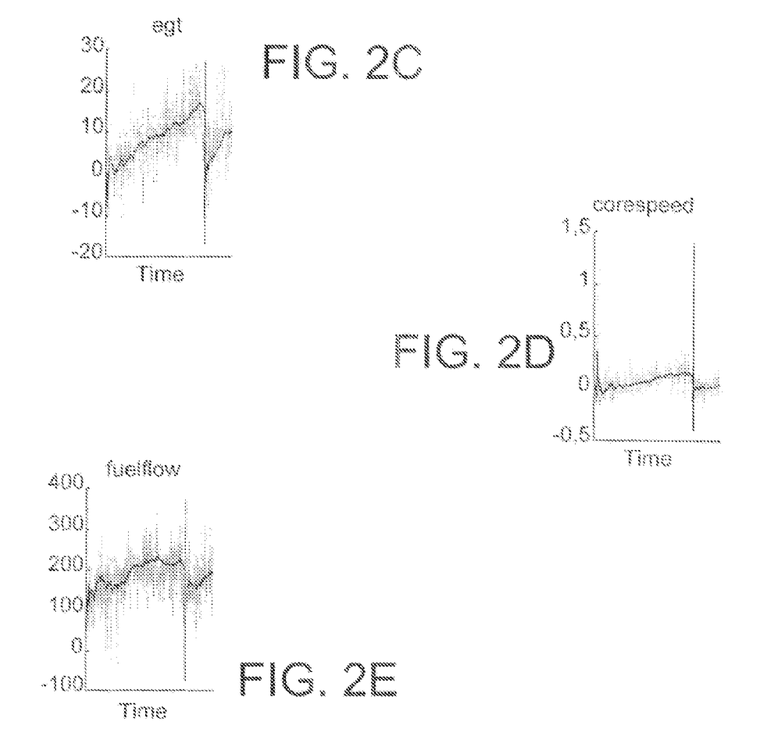
FIGS. 2C-2G show smoothed measurements after elimination of noise and detection of changes.
Figure 2F:
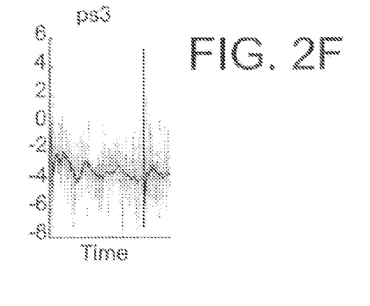
Figure 2G:
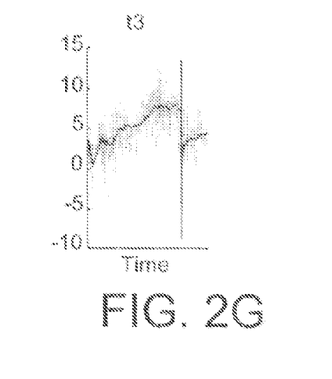

The sudden change for example in FIG. 2D was completely concealed by noise and was only detected after using the sudden change detection tool that cleaned the residual noise around the step. In other words, to take account of sudden changes, the smoothing done by the detection tool to the left of the sudden change is different from the smoothing done to the right of the sudden change.

For example, the sudden change detection tool may be based on joint and parallel use of a set of Recursive Least Squares (RLS) algorithms used to estimate slow variations of signals and a multi-dimensional GLR (Generalised Likelihood Ratio) algorithm working on residues of RLS algorithms to identify sudden changes.

Each RLS algorithm models the residue of an endogenic variable by means of a simple linear model using time, and updates parameters recursively. Therefore each RLS algorithm provides new residues from which slow variations have been eliminated. A multi-dimensional GRL algorithm is used to detect sudden changes on these clean residues.

More precisely, the RLS algorithm uses a least squares cost function but with an exponential type weighting that depends on the age of the observation, thus giving more weight to recent points than to older points. This criterion is then minimised recursively using the following equation:

$$\underset{\alpha,\beta}{\arg\min} \sum_{j=l_m+1}^{t} \theta^{(t-j)}(Y_{i,j}^r - \beta_j + \alpha)^2$$

where $\theta$ is a forget factor and $\beta_j$ the estimated parameters.

After initialisation in flight $l_m$, the trend is estimated until the current flight l. The residue is calculated and tested according to the chosen parameters. If the test detects a change in flight $l_{m+1}$ the calculation is reinitialised. This test may be implemented as a multi-variable calculation such that when a change is detected, all the calculations on each of these variables are simultaneously reinitialised.

Thus, standardisation can form an entry point independent of the context in a multi-dimensional space with dimension p (where p is the number of endogenic variables) representing the condition of the engine at the acquisition date, for each engine 2 and for each acquisition.

Furthermore, the processing means 11 are configured to project each entry point in the multi-dimensional space onto an image point of a previously constructed map (for example see FIGS. 3A-3E) using a determined compression technique.

The map can be constructed during a preliminary learning phase using the same compression technique using a set of normalised learning data. This map may be a self-organising map SOM in 2D and the standardised learning data may be derived from old data for a fleet of aircraft engines and/or simulated data originating from a thermodynamic model of an aircraft engine.

Advantageously, the map can be transformed or adapted over time taking account of new entry points to create other more adapted maps in order to further increase the precision of the predictions.

The compression technique to construct a map or to project the trajectory of an engine 2 onto the map may be made using a Kohonen self-organising map technique. Kohonen mapping or projection is very appropriate for analysing the data distribution in a multi-dimensional space that may be a space with large dimension (for example a 10D space). The two-dimensional map may be considered like an extendable net and the Kohonen projection technique then consists of extending the net in the multi-dimensional space so that it can find the best fit onto a layer containing the input data in the multi-dimensional space. It should be noted that the input data do not fill the multi-dimensional space entirely because these data are usually correlated to each other due to physical constraints. These input data depend on each other almost deterministically in the case of a healthy engine.

More particularly, the Kohonen technique is a classification technique respecting the topology of the multi-dimensional space of the observations. It groups the observations into a number of classes K (or conditions) and constructs a set of vectors $\{m_1, \ldots, m_K\}$ called prototype vectors, each representing a class. A neighbouring structure can be chosen such that classes are laid out on a 2D map formed from a plane grid (for example a hexagonal grid) of K nodes.

Each class or condition (subset of the multi-dimensional space) may be described by a position on the map (in other words an index i on the grid) and a prototype vector $m_i$ in the multi-dimensional space.

Let $\{x_1, \ldots, x_N\}$ be the set of observations used to calibrate the map. Construction of the map corresponds to defining a topology between classes and constructing a set of prototype vectors. Once the topology between the classes has been defined, the Kohonen algorithm can be used to find these prototype vectors, iteratively as described below.

Initially, the prototype vectors are initialised at random in the multi-dimensional space. Then, at each step t, an observation $x_j$ is selected (for example drawn at random) and the following two competition and cooperation phases are done:

competition phase: the class c that is best associated with observation $x_j$ is determined using the equation:

$$c = \arg\min_{i \in \{1, \ldots, K\}} \|x_j - m_i\|$$

cooperation phase: the prototype vectors in class c determined above and in its neighbours on the map are modified using a neighbourhood function $h_{ci}$ defined on the grid, by equation:

$$m_i(t+1) = m_i(t) + \alpha(t)h_{ci}(t)(x_j - m_i(t))$$

where t is the time or the iteration number, $\alpha(t)$ is the algorithm learning parameter and $h_{ci}(t)$ the neighbourhood function at step t between classes c and i.

For example, the following neighbourhood function can be used:

$$h_{ci}(t) = \exp(-d_{ci}/2\sigma_t)$$

where $\sigma_t$ is a radius decreasing in time that defines the neighbourhood on the map, and $d_{ci}$ is the distance on the grid between class c and class i.

In practice, the algorithm is stopped when the prototype vectors no longer change very much or when a maximum number of iterations has been made.

It should be noted that other dimension reduction techniques can be used, for example such as analysis of the residues of the regression of endogenic variables onto exogenic variables as principal component which provides a means of finding the principal axes maximising variances and minimising the construction error.

Furthermore, the projection of entry points of a current engine using the Kohonen technique (or any other projection technique) can be used to form a series of image points on the map reflecting the distribution of entry points in the multi-dimensional space. These image points form a current trajectory representative of a change to current engine conditions on a clearly defined map.

Furthermore, the processing means 11 are configured to compare a portion of the current end of trajectory (in other words the most recent flights of the engine 2) with previously recorded portions of aircraft engine trajectories kept in the database 14 in order to search for similar trajectories.

Advantageously, the comparison of a portion of the current trajectory with other portions of trajectories is made using an edition distance measuring the similarity between the different portions of trajectories.

Each portion of trajectory corresponds to a character string (each node of the grid, prototype vector, is a character), and thus the edition distance is very suitable for measuring the similarity between two character strings that is then equal to the number of characters that have to be modified (delete, insert or replace) to change from one string to the next.

Assume that we want to compare two portions of trajectories defined by the strings $s^1$ and $s^2$. Each string is a sequence of characters $s^j = \{s_1^j, s_2^j, \ldots, s_{n_j}^j\}$ in which each character $s_i^j$ represents a position on the map. We will assume that there are r operations $o_1, \ldots, o_r$ among deletion, insertion and replacement operations that transform the first string $s^1$ into the second string $s^2$. The cost of the global transformation is then equal to the sum of individual costs $\cos t(o_i)$, and the distance between strings $s^1$ and $s^2$ is defined by the minimum value of such an operation:

$$d(s^1, s^2) = \min_{o: o(s^1) = s^2} \sum_{i=1}^{longeur(o)} cost(o_i).$$

Furthermore, the processing means 11 are configured to analyse the statistical variation of the end of the current trajectory as a function of similar trajectories so as to anticipate maintenance operations 17 on the current engine 2.

In using the most recent flights of the current engine 2, the processing means 11 look in the database 14 for portions of trajectories similar to the end of the current trajectory on the map. A trajectory or portion of trajectory similar to the end of the current engine trajectory corresponds to a change to the conditions of an engine that had a similar history to the current engine. Thus, by analysing the path followed by different similar trajectories, the processing means 11 can extrapolate the future of the current trajectory to statistically predict future events on the current engine in order to better guide maintenance operations on this engine. Obviously, by using a large engine database 14, the processing means 11 can make a very precise prediction of future changes to an engine being monitored. For example, if there are a hundred trajectories similar to the current engine trajectory being monitored and eighty out of the one hundred trajectories lead to a need to change an engine part, then it can be deduced that there is 80% chance that the current engine will require the same maintenance operation. Obviously, it would also be possible to predict the engine availability time before the part has to be changed and consequently, the engine that should be given priority for maintenance can be very quickly identified.

Furthermore, it is very advantageous to display the representation of image points on at least one two-dimensional map. Two-dimensional maps have display properties that are very useful for representing multi-dimensional data in two dimensions. Thus, the output means 15 are configured to display graphic representations of changes with time of the condition of an engine 2 or a plurality of engines on screens or on printed sheets.

FIGS. 3A-6 show a few examples of graphic representations on two-dimensional self-organising maps.

FIGS. 3A-3E show a map c1-c5 constructed using the Kohonen technique for which the points represent the distribution of endogenic variable data in a five-dimension space. For example, the topology of the map c1-c5 is configured in the form of a graph of hexagonal lattice. Obviously, it would also be possible to have rectangular or any other shaped lattice. The colour of the map background (for example shading from white to black) corresponds to values of residues of the endogenic variable. Each cell in the map may be coloured depending on the value of the corresponding prototype vector for the endogenic variable considered. The grey scale e1-e5 at the side of map c1-c5 gives the intensity of the corresponding endogenic variable.

Thus, FIGS. 3A-3E show the same map five times for five endogenic variables: the high pressure shaft rotation speed, the fuel flow, the compression output pressure, the compression output temperature and the exhaust gas temperature.

Figure 3A:
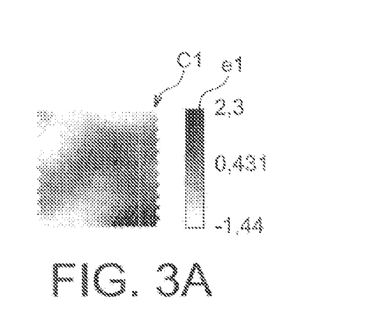
FIGS. 3A-3E show a two-dimensional map constructed using the Kohonen technique reflecting the distribution of endogenous variable data in a multi-dimensional space.

More particularly, FIG. 3A shows the map background c1 for the shaft rotation speed. Each point on this map corresponds to a speed value using shading from white to black. A black dot represents a high speed, a white dot represents a low speed, and a grey dot represents an intermediate speed. For example, a black zone (high speeds) can be seen at the bottom right, a white zone (low speeds) can be seen at the top, and a grey zone (medium speeds) in the middle of c1.

Figure 3B:
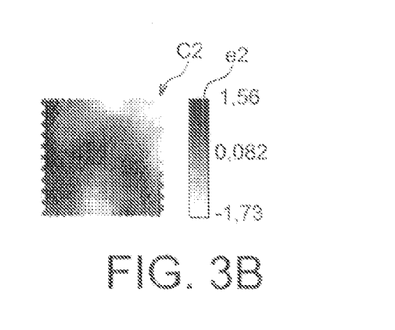

FIG. 3B shows the map background c2 for the fuel flow. The left side (black zone) shows a high fuel consumption while the white zone at the top right represents a low consumption, etc.

Figure 3C:
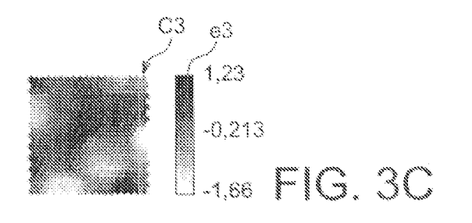
Figures 3D, 3E:
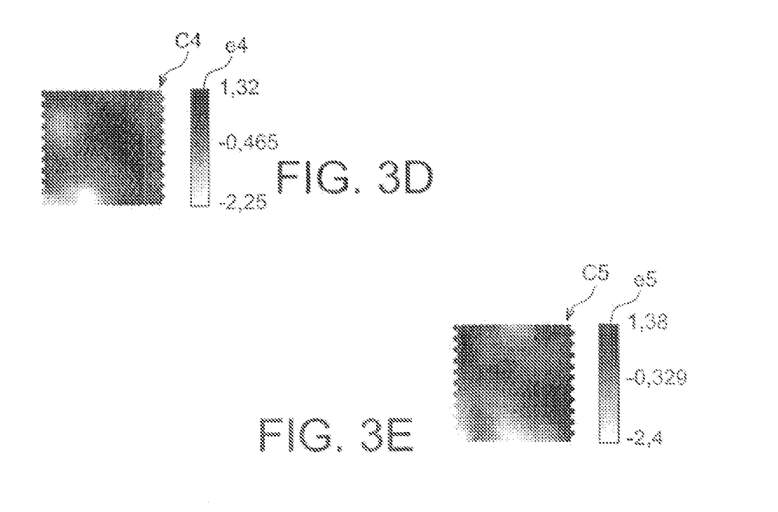

Similarly, FIGS. 3D-3E show map backgrounds c3-c5 for the compression output pressure, the compression output temperature and the exhaust gas temperature respectively.

Thus, each cell in the map corresponds to an engine condition according to the five endogenic variables shown on the five map backgrounds c1-c5. For example, the top left corner corresponds to medium low speed, high output temperature, high fuel consumption and high compression output pressure and temperature conditions. This makes it possible to represent zones corresponding to different types of degradations on the map c1-c5.

The current trajectory of the engine 2 can then be represented on a plurality of map backgrounds each representing one of the endogenic variables in order to display the time history of the condition of the current engine relative to degradation zones in accordance with each endogenic variable.

Figure 4A:
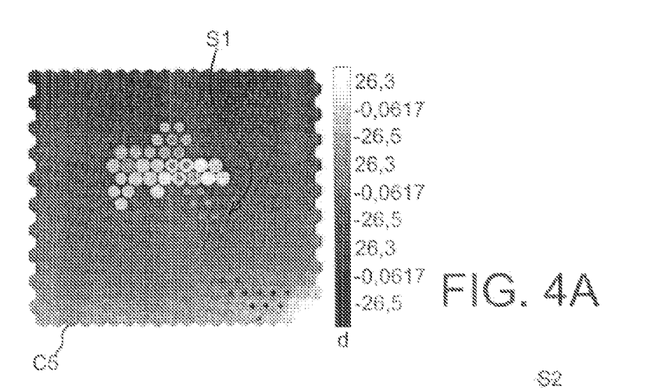
Figure 4B:
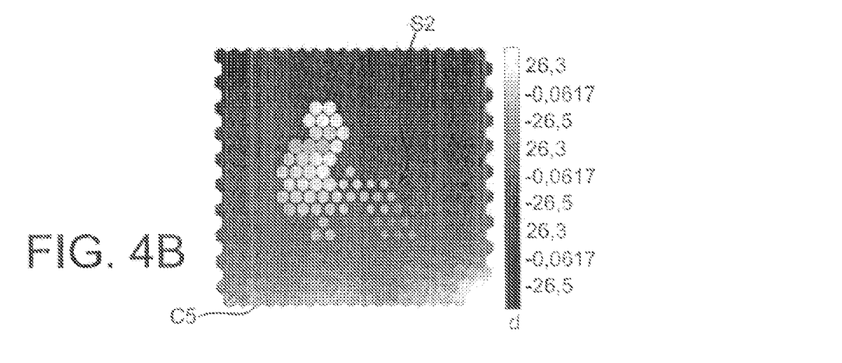
Figure 4C:
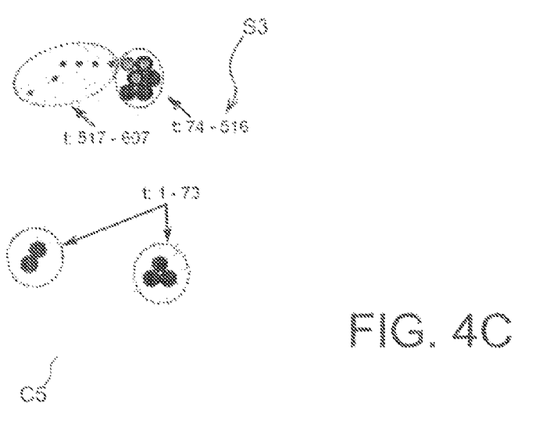

More particularly, FIGS. 4A-4C show the display of current trajectories or series of conditions S1-S3 on a map background c5 representing the exhaust gas temperature EGT. According to this example, the temperature scale e5 on the right shows that the white colour represents a high temperature and the black colour represents a low temperature. The exhaust gas temperature EGT is an indicator well known to engine manufacturers, for example to evaluate wear of the engine 2. A high temperature indicates that a large proportion of energy is beginning to be transformed into heat thus reducing the engine efficiency.

On these figures, the trajectory S1-S3 of the engine is represented by a sequence of dots (that can be represented in several colours) with a decreasing diameter in time, so that a superposition of dots can be represented. The size of the dots thus corresponds to the measurement date, the smaller the dot the more recent it is.

FIG. 4A shows the trajectory S1 of an engine for which the condition remained in the middle of the map c5 for a long time, and then the trajectory S1 started to move downwards towards the bottom right corner of the map c5 that indicates an increase in the exhaust gas temperature EGT due to a natural wear phenomenon.

FIG. 4B shows another example of an engine 2 that behaved normally in the central zone of the map c5 and begins to degrade (the trajectory S2 moving slightly towards a hotter zone) and then the trajectory S2 suddenly shifts upwards towards the top right corner of the map c5 that indicates a reduction of the exhaust gas temperature EGT. This behaviour change indicates that a manipulation has been made on the engine. For example, this manipulation may be cleaning of the engine or the mission of the engine may have been moved to a colder geographic zone.

FIG. 4C shows another example trajectory S3 of an engine 2 with sudden changes. Numbers 1 to 607 show a sequence of flights. In the first engine flights (flights 1 to 73), a small first sudden change took place. A second sudden change took place between flight numbers 73 and 74 before trajectory S3 remained within a zone at the top middle of the map during flights 74 to 516. Finally after a third sudden change, the position of the engine moved into the top left corner at the end of the trajectory (flights 517 to 607). It is obvious that this engine was suffering from a problem of deterioration of at least one of its components and maintenance operations had to be carried out on it.

Furthermore, the end of the current trajectory of an engine and the first similar trajectories classified by order of similarity can be displayed on a plurality of map backgrounds. This provides a means of very precisely predicting changes to the current engine, making the best use of the history of similar engines with similar behaviours.

The current condition of a fleet of engines on a plurality of two-dimensional map backgrounds can also be displayed, each map background representing one of the endogenic variables. This means that an entire fleet of aircraft engines can be displayed simultaneously and a fast comparison can be made between the different engines.

Figure 5:
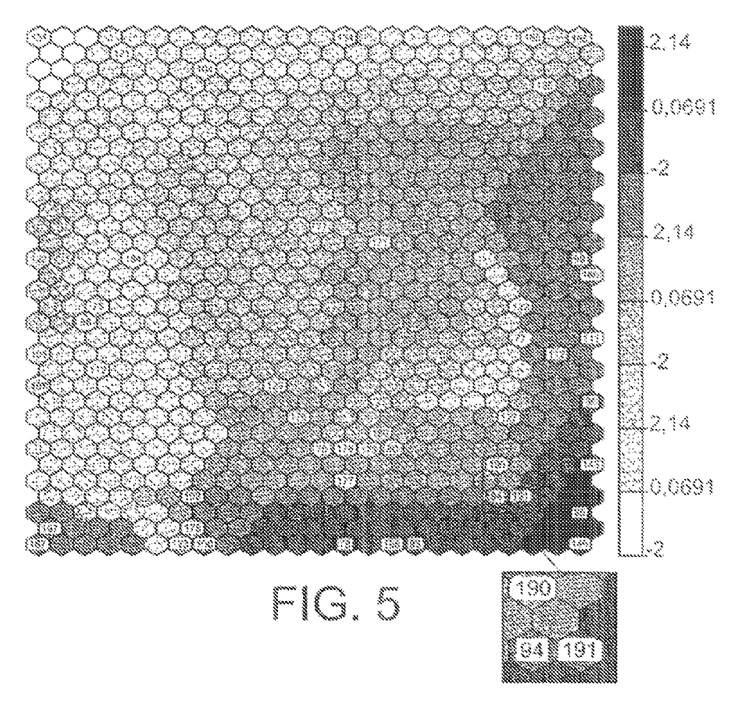
FIG. 5 shows the display of an instantaneous condition of a plurality of engines on a map background representing the exhaust gas temperature.

For example, FIG. 5 shows the display of an instantaneous condition of a plurality of engines on the map background c5 representing the EGT temperature. Each number represents an engine and for example it can be seen that engines 94, 190 and 191 are in a high EGT temperature zone and consequently these engines take priority for maintenance operations.

It should be noted that map backgrounds in the examples in the previous figures can also be replaced by a hierarchical classification in which each point represents a condition of the multi-dimensional space. Two neighbouring points on the map may be more or less close depending on whether the multi-dimensional distance between these points is large or small. Thus, boundaries can be constructed on the map between neighbouring points with large multi-dimensional distances. This means that a number of homogeneous zones can be defined corresponding to particular phenomena that can be easily identified by engine experts.

Figure 6:
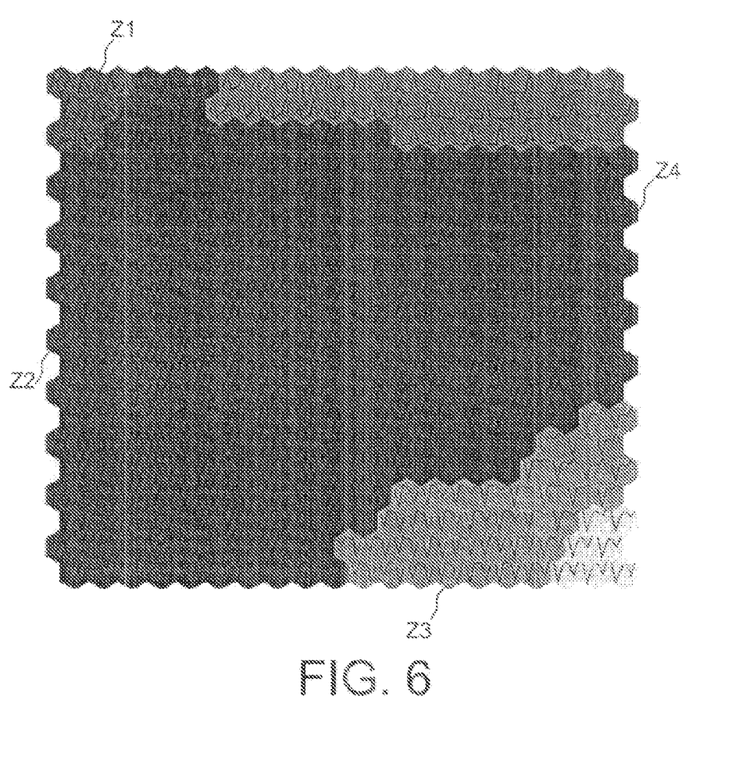
FIG. 6 shows a display of a map corresponding to a hierarchical classification of different map backgrounds representative of endogenous variables, into homogeneous zones.

FIG. 6 shows an example of a display of a map c6 corresponding to a hierarchical classification of different map backgrounds representing endogenic variables in homogeneous zones. For example zone Z1 is a low EGT temperature and low speed zone. Zone Z2 is a high oil temperature zone. Zone Z3 is a high rotation speed zone. Zone Z4 is a normal operation zone. Then, by positioning the trajectory (not shown) of an engine on this map, it is easy to identify if the behaviour of the engine is normal (zone Z4) and the zone towards which it is tending to move.

The map can also be sub-divided in another way into several zones comprising an old engines zone, a zone of engines for which there might be a turbine problem, etc. Similarly, by projecting the trajectory of an engine onto the map, the zone towards which the engine is moving can be seen. This enables a maintenance operator to display the change to the condition of the engine on a screen to improve programming of maintenance operations.

The invention is also aimed at a computer program that can be used in the processing means and comprising code instructions adapted to implementation of a method according to the invention as described above.

The invention claimed is:

1. A method of monitoring an aircraft engine, comprising:
    electronically collecting time history measurements regarding variables related to a current engine and its environment, including a first set of measurements regarding endogenic variables describing behavior of the engine and a second set of measurements regarding exogenic variables describing acquisition context, during each acquisition;
    standardizing measurements related to the endogenic variables taking account of measurements related to the exogenic variables to form an entry point corresponding to a condition of the current engine in a multi-dimensional space, for each acquisition;
    projecting, using a determined compression technique, each entry point in the multi-dimensional space onto an image point on a previously constructed map, to form a sequence of image points on the map reflecting a distribution of entry points in the multi-dimensional space, the image points forming a current trajectory representative of a change to the conditions of the current engine;
    comparing a portion of an end of the current trajectory with previously recorded portions of trajectories of aircraft engines kept in a database to search for similar trajectories;
    analyzing statistical variation of the end of current trajectory as a function of the similar trajectories; and
    forecasting maintenance operations on the current engine.

2. The method according to claim 1, wherein the map is constructed during a preliminary learning phase according to the determined compression technique determined from a set of standardized learning data.

3. The method according to claim 1, wherein the determined compression technique is a Kohonen self-organizing map technique.

4. The method according to claim 1, further comprising displaying image points on at least one two-dimensional map.

5. The method according to claim 4, further comprising displaying the current trajectory on a plurality of two-dimensional map backgrounds each representing one of the endogenic variables.

6. The method according to claim 4, further comprising displaying the end of current trajectory and first similar trajectories classified by order of similarity on a plurality of two-dimensional map backgrounds.

7. The method according to claim 4, further comprising mapping a background display corresponding to a hierarchical classification of different map backgrounds representative of endogenic variables, into homogeneous zones.

8. The method according to claim 4, further comprising displaying a current condition of a plurality of engines on a plurality of map backgrounds each representing one of the endogenic variables.

9. The method according to claim 1, further comprising transforming the map over time taking account of the entry points.

10. The method according to claim 1, wherein the standardizing comprises normalizing endogenic variables using a regression model on a space of context variables, generated by analytic combinations of exogenic variables.

11. The method according to claim 10, wherein the standardizing comprises selecting relevant variables among the context variables according to a minimization criterion.

12. The method according to claim 10, wherein the standardizing comprises cleaning noise on normalized endogenic variables using a tool to detect sudden changes.

13. The method according to claim 1, wherein the comparing between a portion of the current trajectory and other portions of trajectories is made using an edition distance measuring a similarity between the different portions of trajectories.

14. A system for monitoring an aircraft engine, comprising: circuitry configured to
- electronically collect time history measurements of variables related to a current engine and its environment including a first set of measurements on endogenic variables describing behavior of the engine and a second set of measurements on exogenic variables describing acquisition context, during each acquisition;
- standardize measurements related to the endogenic variables taking account of measurements related to the exogenic variables to form an entry point representing a condition of the current engine in a multi-dimensional space;
- project each entry point in the multi-dimensional space onto an image point of a previously constructed map, using a determined compression technique, to form a sequence of image points on the map reflecting a distribution of entry points in the multi-dimensional space, the image points forming a current trajectory representative of a change to the condition of the current engine;
- compare a portion of an end of the current trajectory with previously recorded portions of trajectories of other aircraft engines, kept in a database to search for similar trajectories;
- analyze statistical variation of the end of current trajectory as a function of the similar trajectories; and
- forecast maintenance operations on the current engine.

15. A non-transitory computer-readable storage medium storing computer-readable instructions that, when executed by a computer, cause the computer to perform a method comprising:
- electronically collecting time history measurements regarding variables related to a current engine and its environment, including a first set of measurements regarding endogenic variables describing behavior of the engine and a second set of measurements regarding exogenic variables describing acquisition context, during each acquisition;
- standardizing measurements related to the endogenic variables taking account of measurements related to the exogenic variables to form an entry point corresponding to a condition of the current engine in a multi-dimensional space, for each acquisition;
- projecting, using a determined compression technique, each entry point in the multi-dimensional space onto an image point on a previously constructed map, to form a sequence of image points on the map reflecting a distribution of entry points in the multi-dimensional space, the image points forming a current trajectory representative of a change to the conditions of the current engine;
- comparing a portion of an end of the current trajectory with previously recorded portions of trajectories of aircraft engines kept in a database to search for similar trajectories;
- analyzing statistical variation of the end of current trajectory as a function of the similar trajectories; and
- forecasting maintenance operations on the current engine.

* * * * *